US010762375B2

United States Patent
Ronen et al.

(10) Patent No.: US 10,762,375 B2
(45) Date of Patent: Sep. 1, 2020

(54) MEDIA MANAGEMENT SYSTEM FOR VIDEO DATA PROCESSING AND ADAPTATION DATA GENERATION

(71) Applicant: Microsoft Technology Licensing, LLC, Redmond, WA (US)

(72) Inventors: Royi Ronen, Tel Aviv (IL); Ika Bar-Menachem, Tel Aviv (IL); Ohad Jassin, Tel Mond (IL); Avner Levi, Kiryat Ono (IL); Olivier Nano, Tel Aviv (IL); Oron Nir, Herzeliya (IL); Mor Geva Pipek, Givatayim (IL); Ori Ziv, Givatayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 16/024,172

(22) Filed: Jun. 29, 2018

(65) Prior Publication Data
US 2019/0236396 A1 Aug. 1, 2019

Related U.S. Application Data

(60) Provisional application No. 62/622,864, filed on Jan. 27, 2018.

(51) Int. Cl.
*G06K 9/00* (2006.01)
*G06K 9/34* (2006.01)
(Continued)

(52) U.S. Cl.
CPC ......... *G06K 9/344* (2013.01); *G06K 9/00744* (2013.01); *G06K 9/00751* (2013.01);
(Continued)

(58) Field of Classification Search
CPC ...... G06K 9/18; G06K 9/344; G06K 9/00744; G06K 9/00751; G06K 9/00463; G06K 9/3266; G06K 2009/6213; G06K 2009/01
(Continued)

(56) References Cited

U.S. PATENT DOCUMENTS 8,290,273 B2 10/2012 Prasad et al.
9,191,554 B1 11/2015 Manohar et al.
(Continued)

FOREIGN PATENT DOCUMENTS

WO 2016003436 A1 1/2016

OTHER PUBLICATIONS

"ConTEXTract™ Video OCR", Retrieved From https://web.archive.org/web/20120703044930/https://www.sri.com/engage/products-solutions/contextract-video-ocr, Jul. 3, 2012, 1 Page.
(Continued)

*Primary Examiner* — Gabriel I Garcia
(74) *Attorney, Agent, or Firm* — Shook, Hardy & Bacon L.L.P.

(57) ABSTRACT

In various embodiments, methods and systems for implementing a media management system, for video data processing and adaptation data generation, are provided. At a high level, a video data processing engine relies on different types of video data properties and additional auxiliary data resources to perform video optical character recognition operations for recognizing characters in video data. In operation, video data is accessed to identify recognized characters. A video OCR operation to perform on the video data for character recognition is determined from video character processing and video auxiliary data processing.
(Continued)

Video auxiliary data processing includes processing an auxiliary reference object; the auxiliary reference object is an indirect reference object that is a derived input element used as a factor in determining the recognized characters. The video data is processed based on the video OCR operation and based on processing the video data, at least one recognized character is communicated.

20 Claims, 8 Drawing Sheets

(51) Int. Cl.
    *G06K 9/32*     (2006.01)
    *G06K 9/62*     (2006.01)

(52) U.S. Cl.
    CPC ... *G06K 9/3266* (2013.01); *G06K 2009/6213* (2013.01); *G06K 2209/01* (2013.01)

(58) Field of Classification Search
    USPC .......................................................... 382/100
    See application file for complete search history.

(56) References Cited

U.S. PATENT DOCUMENTS

| | | | |
|---|---|---|---|
| 9,876,982 B2 | 1/2018 | Zhu et al. | |
| 2005/0125224 A1* | 6/2005 | Myers | G10L 15/24 704/231 |
| 2007/0011012 A1* | 1/2007 | Yurick | G10L 15/26 704/277 |
| 2015/0254507 A1* | 9/2015 | Lin | G06K 9/18 382/176 |

OTHER PUBLICATIONS

"Entity linking", Retrieved From https://en.wikipedia.org/wiki/Entity_linking. , Retrieved On: Dec. 18, 2017, 4 Pages.

Chen, et al., "Text detection and recognition in images and video frames", In Journal of Pattern Recognition, vol. 37, Issue 3, Mar. 2004, pp. 595-608.

Hua, et al., "Efficient video text recognition using multiple frame integration", In Proceedings of International Conference on Image Processing, Sep. 22, 2002, pp. 397-400.

Julia, Kornich, "Use Azure Media Analytics to convert text content in video files into digital text", Retrieved From https://docs.microsoft.com/en-us/azure/media-services/previous/media-services-video-optical-character-recognition, Dec. 9, 2017, 10 Pages.

Lienhart, Rainer, "Video OCR: A Survey and Practitioner's Guide", In Publication of Springer—Video Mining, Jan. 2003, pp. 1-23.

Shetty, et al., "Ote-OCR based text recognition and extraction from video frames", In Proceedings of IEEE 8th International Conference on Intelligent Systems and Control, Jan. 10, 2014, pp. 229-232.

Solanki, Adarsh, "Announcing Video OCR Private Preview on Azure Media Analytics", Retrieved From https://azure.microsoft.com/en-in/blog/ocr-on-azure-media-analytics/, Apr. 20, 2016, 9 Pages.

Yang, et al., "Content Based Lecture Video Retrieval Using Speech and Video Text Information", In Journal of IEEE Transactions on Learning Technologies, vol. 7, No. 2, Apr. 2014, pp. 142-154.

\* cited by examiner

MEDIA MANAGEMENT SYSTEM FOR VIDEO DATA PROCESSING AND ADAPTATION DATA GENERATION

CROSS-REFERENCE TO RELATED APPLICATIONS

This application claims priority to Provisional Patent Application No. 62/622,864, filed Jan. 27, 2018, and entitled "Media Management System for Video Data Processing," the entire contents of which is incorporated herein by reference in its entirety.

BACKGROUND

Users work with media (e.g., images, handwriting, and scanned documents) that include text. An optical character recognition computing device system ("OCR system") may execute operations that convert different types of text to electronic text format, such that the text may be edited, stored, searched or displayed. Optical character recognition can be implemented in different contexts for a variety of inputs. For example, data entry, automated number plate recognition, converting handwriting, and so on, with each context providing different types of challenges and opportunities for OCR systems. With the ever-increasing use of computing devices, improvements in OCR system functionality in extracting relevant text elements can make them more reliable. As such, developing new operations in OCR systems can help provide more efficient processing and more accurate OCR results.

Users also work with audio in different capacities (e.g., music, communications, video) directed to particular end users or audiences. Digital audio, in particular, is audio that is recorded or converted to digital form, where the sound waves, of an audio signal, are digitally encoded. A speech recognition computing system ("speech recognition system") may operate with digital audio, in that spoken language may be converted into digital form to identify text (e.g., "speech-to-text"). An acoustic model and other components of a speech recognition system may be used to support the translation of speech, sometimes trained for a particular user's voice, to text.

With the growth of voice recognition based systems, improvements in speech recognition system operations in recognizing speech may make voice-recognition-based systems more dependable. As such, improvement of existing features in speech recognition systems can help improve computer functions in providing speech recognition functionality.

SUMMARY

Embodiments of the present invention relate to methods, systems, and computer storage media for providing video data processing in a media management system. In particular, video data processing is based on several different video optical character recognition ("OCR") techniques including, video character processing, video cluster processing, and video auxiliary data processing, that determine characters or words (i.e., character variants or word variants collectively referred to as "candidates" or "candidate variants") that are identified and selected as recognized characters from video data. Video data is processed through a video data processing engine that is programmed to selectively implement a video OCR technique to provide improved processing of video data for optical character recognition.

In operation, a video data processing engine ("processing engine") receives video data to identify recognized characters. A video OCR operation is performed on the video data. As used herein, video data comprises audio data unless described otherwise. The particular video OCR operation may be selected based on properties of the video data or based on a user indication selecting an OCR operation. A selected video OCR operation provides instructions, based on a set of rules, which are executed for processing the video data. A video OCR operation is selected from a plurality of video OCR operations that include the following: video character processing, where video character processing includes aggregating, aligning, weighting, and voting on a plurality of characters in video character processing scenes, to determine recognized characters; and video cluster processing, where video candidate scoring includes aggregating, aligning, weighting, and voting on a plurality of characters in two or more videos, to determine recognized characters.

Candidate variants identified, either in a number of video character processing scenes or throughout a video or videos, may be weighted. Weighting candidate variants may be performed using candidate weighting and scoring techniques. Candidate variants are weighted, based on a specific weighting technique, and scored with a weighted score, such that selecting a candidate variant as a recognized character or recognized word may be based on the weighted score. Several different attributes associated with candidate variants (e.g., number of occurrences, duration in video, size, color, language model, transcript, etc.) may be used to weight and score the candidate variants. Voting on different candidate variants to select a recognized character may be by simple majority voting between candidate variants or weighted voting when candidates are voted on their weighted score discussed above.

OCR operations also include auxiliary data processing. In one embodiment, auxiliary data processing includes accessing a video property (e.g., video images, video languages, video people, video transcript, video objects, and video music soundtrack) and analyzing the video property based on internal or external auxiliary data to derive input elements. The derived input elements are used as input for OCR operations. In this regard, the auxiliary data supplement OCR operations based on derived input element. Auxiliary data can be retrieved from a variety of auxiliary data sources including an entity linking knowledgebase, a facial recognition knowledgebase, an object recognition knowledgebase, a user account profile comprising an account language model, and an audio recognition knowledgebase. In operation, auxiliary data can be used to determine an OCR reference object or indirect reference object which can be used to supplement character recognition. A particular type of auxiliary data, used in recognizing characters, may further be used in determining a weight for a recognized character and scoring the recognized character with an overall confidence score.

Exemplary auxiliary data processing operations also include language detection and selection. Language detection and selection includes detecting at least two or more languages and selecting exclusively the two or more languages for executing character recognition, while excluding other potential OCR languages corresponding to the video data. The other potential OCR languages may be other languages that the system is capable of using for auxiliary data processing but simply excluded in this processing instance. The selected two or more languages may also be utilized in excluding character variants or word variants that are recognizable but not part of the two or more languages. In another example, facial recognition and object recognition may be used to identify a prominent person or prominent object in the scene and that information is further used to generate a derived input element for the OCR operation.

The video data processing engine may further operate with a language adaptation model and an acoustic model to adapt a generic speech recognition model to a specialized vocabulary and the use of the specialized vocabulary in context to support speech recognition. Adaptation data can be automatically generated in order to support speech recognition. An adaptation data generator engine may implement various techniques to generate adaptation data. The techniques include visual-signal-based adaptation, context-based adaptation, and editing-data-based adaptation. The adaptation data generator engine may be implemented to provide this functionality, such that speech recognition output or results are provided with improved and higher precision.

In this way, the embodiments described herein improve the user computing devices and their functioning, for a media management system operating on devices for video OCR and speech recognition, by improving their processing operations, such as by providing novel techniques, computer functionality, data structures, and sets of rules for faster and efficient character recognition and automated generation of adaptation data.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 7 is a flow diagram showing an exemplary method for implementing a media management system, in accordance with embodiments described herein; and.

DETAILED DESCRIPTION

Figure 1:
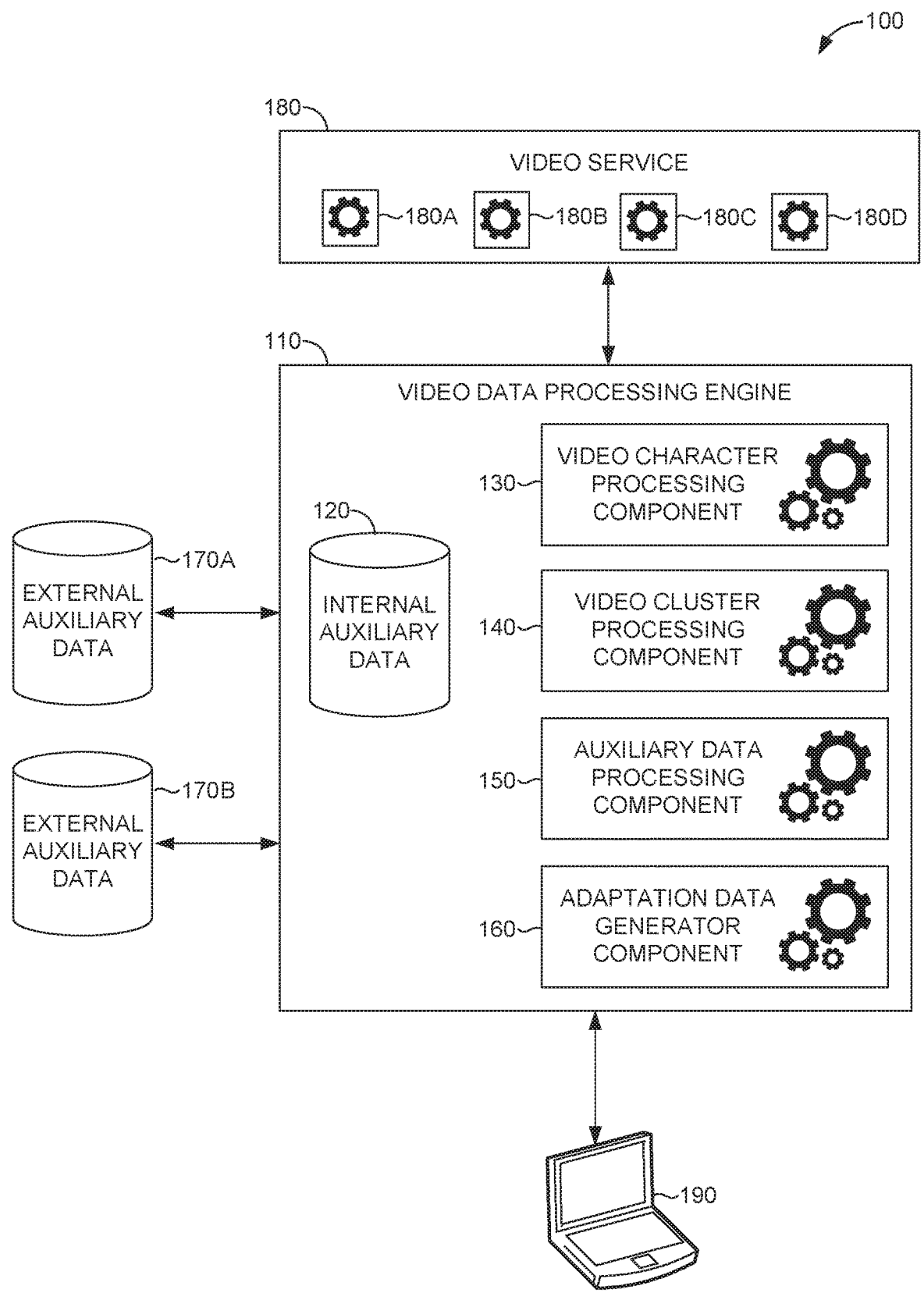
FIG. 1 is a block diagram of an exemplary media management system environment in which embodiments described herein may be employed.

Optical Character Recognition ("OCR") generally refers to the conversion of images of typed, handwritten, or printed text into machine-encoded text. OCR can be performed on a variety of media from scanned documents to video content. Character recognition can be implemented in different contexts for a variety of inputs. Conventional OCR systems are capable of analyzing and detecting text (e.g., characters and words) when presented with a single instance (e.g., document page, photograph, or other media). In other words, conventional OCR systems work on media (e.g., video data) intrinsically within the particular instance of media being recognized with limited sophistication for using extrinsic information. Video data includes a sequence of video frames that are related to each other. Video data is also associated with other auxiliary data, such as external data sources, internal data sources, video metadata and other properties of the video data that can be accessed. With conventional OCR systems analysis of video data, video data tends to be processed using intrinsic information, there by missing opportunities to leverage extrinsic information for performing OCR operations.

With reference to a specific example, a video frame can include noise that hinders the OCR process. For example, a video frame can include the text—"LONG TEXT". The video can have several frames, where in some frames the "LONG TEXT" is blocked, such as by a person in the scene of the video frame. In one frame, the "_NG" text is shown, where the "LO" portion of "LONG TEXT" is blocked and in a second frame the "_E_T" is shown, where the "T_X_" portion of "LONG TEXT" is blocked. In other more egregious instances, only partial texts being available or false positives are identified. Conventional OCR systems for video OCR are limited in sophisticated solutions to convert such images, across video frames, when the text is partially blocked or when there exist other types of noise in the video frames. As such, a comprehensive system that overcomes the pitfalls of intrinsic only operations for OCR would improve on OCR results, especially for video.

Embodiments of the present invention relate to methods, systems and computer storage media for providing video data processing in a media management system. In particular, video data processing is based on several different video optical character recognition ("OCR") techniques including, video character processing, video cluster processing, and video auxiliary data processing, that instruct on what character variants or word variants (collectively referred to as "candidates" or "candidate variants") are identified and selected as recognized characters from video data. Video data is processed through a video data processing engine that can selectively implement video OCR techniques to provide improved processing of video data for optical character recognition.

At a high level, the present invention relies on different types of video data properties, such as a sequence of frames, audio track, transcript, recognized people and objects within frames, amongst other properties and additional auxiliary resources (collectively referred to as "OCR reference objects" comprising indirect reference objects), such that two or more of the OCR reference objects are used for character recognition of characters in the video data. An object can generally refer to a variable, a data structure, a function, or a method, and as such, is a location in memory having a value and referenced by an identifier. The techniques identified above operate as rules that are selectively applied to the OCR reference objects to recognize characters, as discussed in more detail below. In this regard, the present invention expands on the functionality of conventional systems, in that the OCR operations described herein operate on the combination of intrinsic and extrinsic information when performing OCR operations. In addition, the present invention further relies specifically on different properties of video data to identify extrinsic input that is used for character recognition.

In operation, a video data processing engine ("processing engine") receives video data to identify video recognized characters. The video data can be received from a plurality of different sources. The processing engine can selectively implement operations directed different processing techniques operable as components of the processing engine. A particular processing technique can be selected implicitly (i.e., a context-awareness-based identification—such as the type of video, source of video, the user, or other properties or metadata of the video) or explicitly (i.e., user-based identification—such as a user selecting to run the particular processing technique on the video). For example, a video can include a music soundtrack. As such, the auxiliary data processing video OCR operation can be triggered implicitly or explicitly such that the music soundtrack is used in combination with the video data to recognized characters.

The processing engine supports video character processing. Video character processing comprises two or more of aggregating, aligning, weighting, and voting on a plurality of characters across a plurality of video character processing scenes to determine recognized characters. A scene of the video data can be a particular setting in the video, a reference video frame, a collection of consecutive and non-consecutive frames that share a threshold of the same detectable properties. A scene can then be defined based on detecting the same set of similar characters in different instances of the scene.

With reference to speech recognition, audio may be utilized in different capacities (e.g., music, communications, and video) directed to particular end users or audiences. Digital audio, in particular, is audio that is recorded or converted to digital form, where the sound waves of an audio signal are digitally encoded. Speech recognition can operate with digital audio in that spoken language can be converted into digital form to identify text (e.g., "speech-to-text"). A language model, an acoustic model, and other components of a speech recognition system can be used to support the translation of speech, sometimes trained for a particular user's voice, to text. By way of background, a language adaptation model and acoustic model can be used to adapt generic speech recognition models to a specialized vocabulary and acoustics, and use of the vocabulary and acoustics in context. However, generating the adaptation data is not insignificant and often requires a lot of manual intervention. As such, improvement of existing features in speech recognition systems can be based on improvement of computer operations that provide speech recognition functionality. With the growth of voice recognition based systems, improvements in speech recognition system operations in recognizing speech can make them more dependable.

As such, embodiments of the present invention are further directed to an adaptation data generator that operates to automate the generation of adaptation data. Adaptation data can be automatically generated in order to support speech recognition. An adaptation data generator can implement various techniques to generate adaptation data. The techniques include visual-signal-based adaptation, context-based adaptation, and editing-data-based adaptation. The adaptation data generator engine can be implemented to provide this functionality, such that speech recognition output or results are provided with improved and higher precision.

In operation, visual signals from corresponding video data can be used to derive adaptation data from public and private data. For example, recognizing the face of a prominent person may trigger accessing presentations, materials from the web, transcribed talks, emails, and other types of public and private data for adaptation data. Similarly, detecting a logo can trigger deriving adaptation data related to the logo or a product associated with the logo from public and private data. Further, the context of recognized speech can be used to derive adaptation data. For example, entities recognized with, for example, an entity linking engine, can be used to retrieve adaptation data. Also, portions of high-confidence transcription can be used as adaptation data to transcribe parts with low confidence. Metadata, given by the user, such as genre, author, and other inputs coming from the same user, industry, domain, and other reference groups can also be used to derive adaptation data. In editing-data-based adaptation, user edits done in transcriptions can be used to derive adaptation data.

Referring initially to FIG. 1, FIG. 1 illustrates an exemplary media management system 100 in which implementations of the present disclosure may be employed. In particular, FIG. 1 shows a high level architecture of a media management system 100 with a video data processing engine ("processing engine") 110. The processing engine 110 having auxiliary data 120, video character processing component 130, video cluster processing component 130, auxiliary data processing component 140, adaptation data generator component 160, and external auxiliary data components 170A and 170B, in accordance with implementations of the present disclosure. The media management system 100 further includes video services 180 having a plurality of video services (or analyzers) (e.g., video service 180A, 180B, 180C and 180D) and a client device 190.

Embodiments of the present disclosure are described in detail below with reference to examples, such as a media management system having a processing engine 110 for video data processing. The processing engine 110 is responsible for video data processing. A computing device (e.g., client device 190) can be used to access a graphical user interface (not shown) associated with the processing engine 110 to access video data. The processing engine 110 processes video data (having audio data) to detect recognized characters and generate adaptation data based on a plurality of components in the media management system 100. The processing engine 110 implements video character processing, video cluster processing, and video auxiliary data processing, to instruct on what candidate variants are selected and identified as recognized characters from video data. The processing engine 110 also implements visual-signal-based adaptation, context-based adaptation, and editing-data-based adaptation to automatically generate adaptation data. The processing engine 110 further operates with internal auxiliary data 120 and external auxiliary data 170A and 170B to provide functionality described herein. The processing engine 110 can rely on video services (e.g., OCR services, language models, acoustic models, and corresponding Application Programming Interfaces—APIs) to perform analysis on video data. The video service 180 is an exemplary video service that performs video analysis using a plurality of service components (e.g., 180A, 180B, 180C and 180C). Other variations and combinations of data stores and access mechanism for retrieve video content are contemplated with embodiments described herein.

Figure 2:
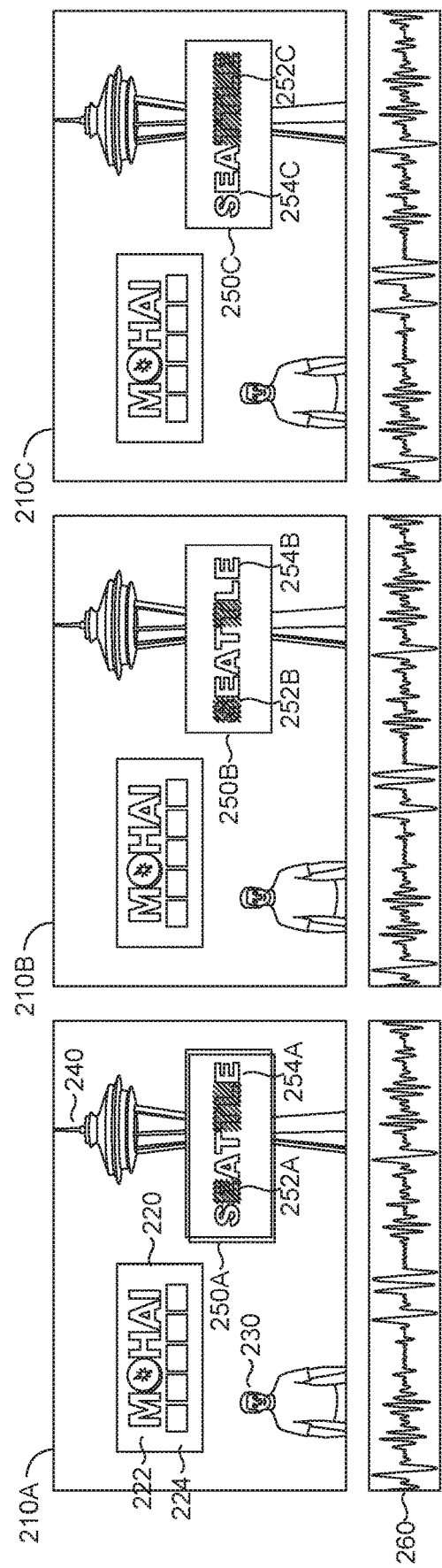
FIG. 2 is a schematic exemplary representation of features of the media management system, in accordance with embodiments described herein.

With reference to FIG. 2, FIG. 2 includes frames 210A, 210B and 210C, a text area 220 with text portion 222 and text portion 224, person 230, object 240, text area 250A with text portion 252A and text portion 254A, and audio track 260. Text portion 252A may be associated with a low confidence score while text portion 254A is associated with a high confidence score. For example, as shown in FIG. 2, for a particular scene, the following character variants and word variants may be determined "S£AT_I_" from a first video frame, "_E˘AT_E" from a second video frame, and "SEA_TLÆ" from a third video frame. Where, "£" "I" "A" and "Æ" are incorrectly identified or have low confidence scores. Because the same scene may also be captured from different perspectives, the series of word variants may further have to be aligned. The characters and words may be aligned such that, for the candidate variants, a voting operation is performed to determine the correct recognized character. The voting may be majority voting or weighted voting. Audio track 260 may be the video soundtrack including voiceover, scene audio, or music soundtrack that can be accessed and analyzed for metadata to be utilized in functionality described herein.

Figure 3:
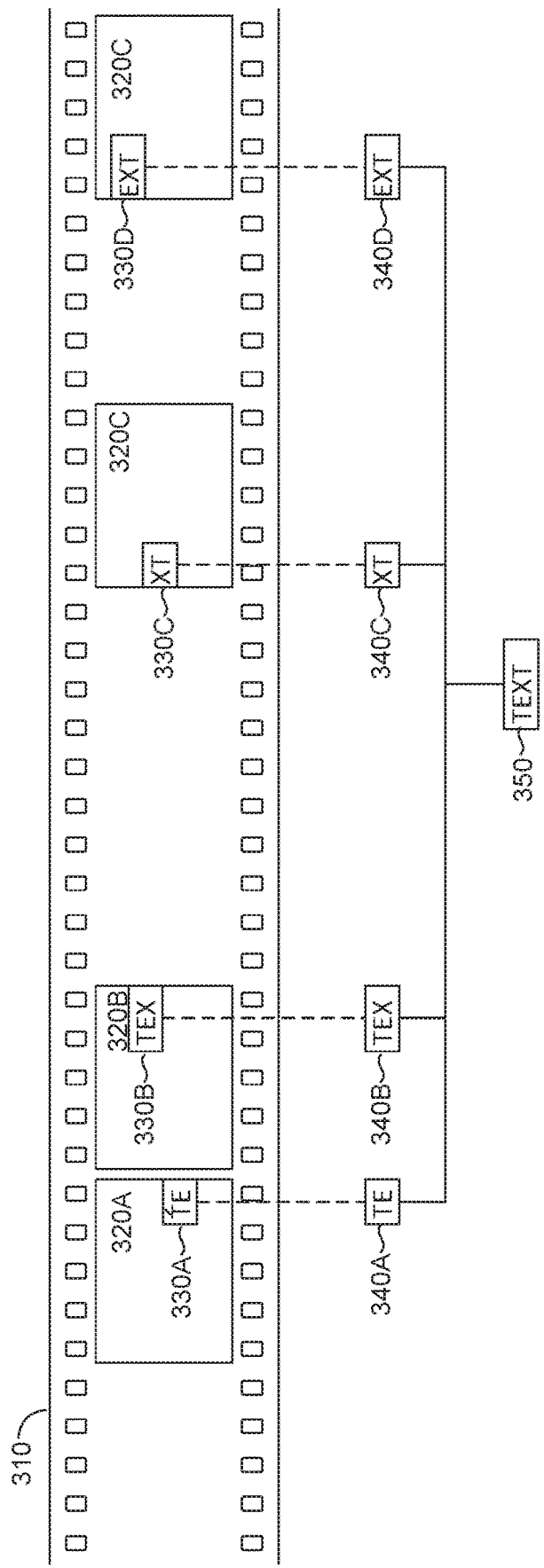
FIG. 3 is a schematic exemplary representation of features of the media management system, in accordance with embodiments described herein.

With reference to FIG. 3, video strip 310 can represent frames of video stitched together from multiple video sources as shown as 320A, 320B, 320C, and 320D. The processing engine supports video cluster processing of frames 320A, 320B, 320C, and 320D. Video cluster processing is video character processing of a plurality of characters across a single video or multiple videos to determine recognized characters. Video cluster processing also includes aggregating and aligning a plurality of characters (e.g., TEXT—330A, 330B, 330C and 330D to TEXT 340A, 340B, 340C and 340D) for a video to determine a recognized character (e.g., TEXT 350), in part based on voting on character recognition variants determined throughout the video. For example, "S£AT_I_" from a first video frame in a first video from a first perspective, "_E˘AT_E" from a from a second video frame in a second video from a second perspective, and "SEA_TLÆ" from a third video frame from a third video in a third perspective can be used to recognize the word "SEATTLE".

Candidate variants identified, either in a number of video character processing scenes or throughout a video or videos, can be weighted using candidate weighting techniques, where candidate variants are weighted, based on a specific weighting technique, and scored with a weighted score, such that selecting a candidate variant as a recognized character or recognized word is based on the weighted score. For example, each of the character variations in the candidate variant "SEATTLE" in FIG. 2, as described above, can be weighted and scored differently, such that a weighted vote or majority vote is used to determine the correct recognized word. Several different attributes associated with candidate variants (e.g., number of occurrences, duration in video, size, color, language model, transcript, etc.) can be used to weight and the score the candidate variants. Voting on different candidate variants to select a recognized character can be by simple majority voting between candidate variants or weighted voting when candidate variants are voted based on their weighted score discussed above.

A processing engine is responsible for auxiliary data processing where video properties (e.g., video images, video languages, video people, video transcript, video objects, and video music soundtrack) are analyzed to derive input elements from auxiliary data, where the derived input elements are used as input for OCR operations. In operation, auxiliary data, determined based any of the following: entity linking knowledgebase, a facial recognition knowledgebase, an object recognition knowledgebase, a user account profile comprising an account language model, and audio recognition knowledgebase can be used to determine an OCR reference object or indirect reference object which can be used to supplement character recognition. A particular auxiliary data type, used in recognizing characters, can further be used in determining a weight and scoring the recognized character with an overall confidence score.

The type of auxiliary data can be used in determining a confidence score associated with a candidate or a recognized character. A candidate score or recognized character can be scored, where character variants or word variants are scored with a confidence score based on internal or external auxiliary data, such that selecting a character variant or a word variant as a recognized character or recognized word is based on the confidence score. Specifically, the confidence can be used for breaking ties between different candidate variants. The confidence score can specifically support functionality for efficient or use of fewer resources, so that OCR operations performed by computing devices run faster, or to run with less memory requirements or other resources or to consume less energy to improve efficiency of retrieval or processing. For example, if a confidence score is defined as a threshold score for recognized characters, the threshold score can be achieved much faster with the functionality and components described herein.

Exemplary auxiliary data processing operations include language detection and selection, which includes detecting at least two or more languages and selecting exclusively the two or more languages for executing character recognition. The selected two or more languages can be utilized in excluding character variants or word variants that are recognizable, but not part of the two or more languages. In another example, entity linking based on a transcript of the video and an external auxiliary data store, facial recognition, object recognition, a user account of identified preferences, historical behavior (e.g., histograms) and other user information can be used to identify information that is further used to generate a derived input element for the OCR operation.

The video data processing engine can further operate with a language adaptation model and an acoustic model to adapt a generic speech recognition model to a specialized vocabulary and then use of the specialized vocabulary in context. Adaptation data can be automatically generated in order to support speech recognition. An adaptation data generator engine can implement various techniques to generate adaptation data. The techniques include visual-signal-based adaptation, context-based adaptation, and editing-data-based adaptation. In particular, the visual signals can be used to derive adaptation data from public and private data. For example, facial recognition of a prominent person may trigger accessing presentations, materials from the web, transcribed talks, emails, and other types of public and private data for adaptation data. Similarly, detecting a logo can trigger deriving adaptation data related to the logo or a product associated with the logo from public and private data. Further, the context of recognized speech can be used to derive adaptation data. For example, entities recognized with an entity linking engine, for example, can be used to retrieve adaptation data. Also, portions of high-confidence transcription can be used as adaptation data to transcribe parts with low confidence. Metadata given by the user such as genre, author, and other inputs coming from the same user, industry, domain, other reference groups may be used to derive adaptation data. With reference to editing-data-based adaptation, user edits done in transcriptions can be used to derive adaptation data. In one embodiment, a language model may be generated with the data automatically adapted for speech recognition.

With continued reference to FIG. 1, the video character processing component 130 is responsible for collecting and aligning a plurality of characters per scene of video to determine recognized characters. The video character processing component 130 can also operate to align the word variants. The video character processing component 130 implements voting to determine what the correct recognized character should be. The voting may be majority voting or weighted voting.

The video cluster processing component 140 processes clusters candidates (e.g., word variants or character variants) identified throughout an entire video or multiple videos. Unlike the video character processing component 130 that depends on comparing based on a particular scene the video cluster processing component would likely have several additional perspectives of the same character variants and word variants throughout the video. The video cluster processing component performs OCR operations over a single video or multiple videos to determine a recognized character, in part based on voting on character recognition variants determined throughout the videos.

The auxiliary data processing component 150 is responsible for executing OCR operations that are associated with auxiliary data. The auxiliary data processing component 150 can access auxiliary data associated with video data and process the video data to recognize characters. The auxiliary data processing component 150 can support language detection and selection. Using several different methods (e.g., pre-built language detection models, facial features of speaker, transcript language, receiving an indication of languages, inferring a language based on video properties or metadata) two or more languages are detected. Two or more languages are selected as dominant languages associated with the video data. It is contemplated that the language detection and selection can also be performed for only one language. Character detection is performed based only on the two or more languages. Advantageously, there is noise reduction in character recognition as the auxiliary data processing component 150 discards of at least one character variant or word variant that would have had to be processed for a language that would be otherwise irrelevant for character recognition.

In one embodiment, the selected two or more languages maybe implemented as preferred languages. As preferred languages, certain detection operations, that would otherwise be ambiguous, can be resolved in favor of the preferred language. So the auxiliary data processing component 150 utilizes the preferred languages in excluding character variants or word variants that are recognizable but not part of the two or more languages. As discussed, additional processing that would have otherwise occurred for several different languages is obviated and OCR accuracy and processing time is improved. Other variations and combinations of detecting and selecting a dominant language inherently from the video for obviating unnecessary processing are contemplated with embodiments of the present invention.

The auxiliary data processing component 150 can also execute OCR operations that are based on indirect auxiliary data (i.e., indirect reference object). The auxiliary data processing component can access indirect auxiliary data associated with the video data and process the video data to recognize characters. Indirect auxiliary data can include facial recognition, object recognition, audio recognition, and account-based language model where that object is then determined (i.e., indirectly) to be a prominent person, famous object, voice, or word such that character recognition is further based on the identified person or famous object. In this regard, the video data indirectly supports character recognition. Similarly, a natural language processing technique entity linking may also to indirectly support character recognition, in that the natural language processing technique of entity linking (i.e., determining the identity of entities mentioned in text) can be applied to a transcript term that is present in the transcript of the video data, such that a candidate (or candidate variants) identified in the video data can be easily determined. In particular, based on the transcript term's association with an entity, via entity linking using an external corpus, the candidate can be correctly identified.

The adaptation data generator component 160 is responsible for generating adaptation data for speech recognition. By way of example, a first video can be analyzed with a facial recognition engine to identify a speaker. The speaker may be a famous British actor that who with a British accent. Based on identifying the speaker, a second video of the speaker can be identified from a public visual knowledgebase or a private visual knowledgebase. The second video is automatically identified as adaptation data that is used to modify a speech recognition model. In this example, the audio data from the second video can be used to improve acoustic features (e.g., speaking style, accent, speech anatomy) of the speech recognition model. For example, the speech recognition model can be adapted such that the word "advertisement" is recognized based on the British pronunciation (i.e., uhd-VER-tis-muhnt) and not the American pronunciation (i.e., AD-ver-ties-muhnt).

In this regard, the adaptation generator component 160 automates the generation of adaptation data in order to improve the dependability of speech recognition based performing adaptation data generation operations. Adaptation data generation operations include accessing the video data comprising audio data and identifying a visual signal or metadata corresponding to the video data. In some embodiments, the adaptation data generation operation also includes selecting a secondary data source based on the visual signal or metadata, and accessing an adaptation data item from the secondary data source. The adaptation data generation operation further includes identifying a speech recognition model feature of the adaptation data item and modifying a parameter of the speech recognition model based on the speech recognition model feature of the adaptation data item. Based on the speech recognition model, a speech recognition data item in the audio data is determined and communicated.

With reference to FIGS. 4, 5, 6 and 7, flow diagrams are provided illustrating methods for implementing a media management system. The methods can be performed using the media management system described herein. In embodiments, one or more computer storage media having computer-executable instructions embodied thereon that, when executed, by one or more processors, can cause the one or more processors to perform the methods in the media management system.

Figure 4:
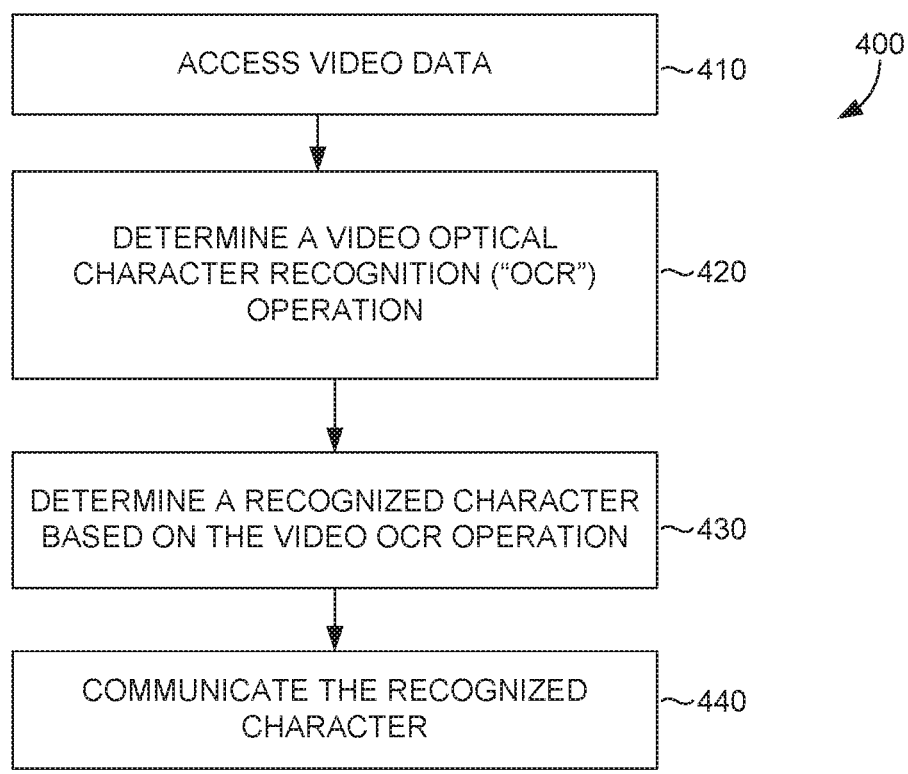
FIG. 4 is a flow diagram showing an exemplary method for implementing a media management system, in accordance with embodiments described herein.

Turning now to FIG. 4, a flow diagram is provided that illustrates a method for implementing functionality of a media management system. Initially at block 410, video data is accessed to identify recognized characters. At block 420, a video optical character recognition operation to perform on the video data for character recognition is determined. At block 430, the video data is processed based on the one or more video OCR operations. At block 440, based on processing the video data, at least one recognized character is communicated.

Figure 5:
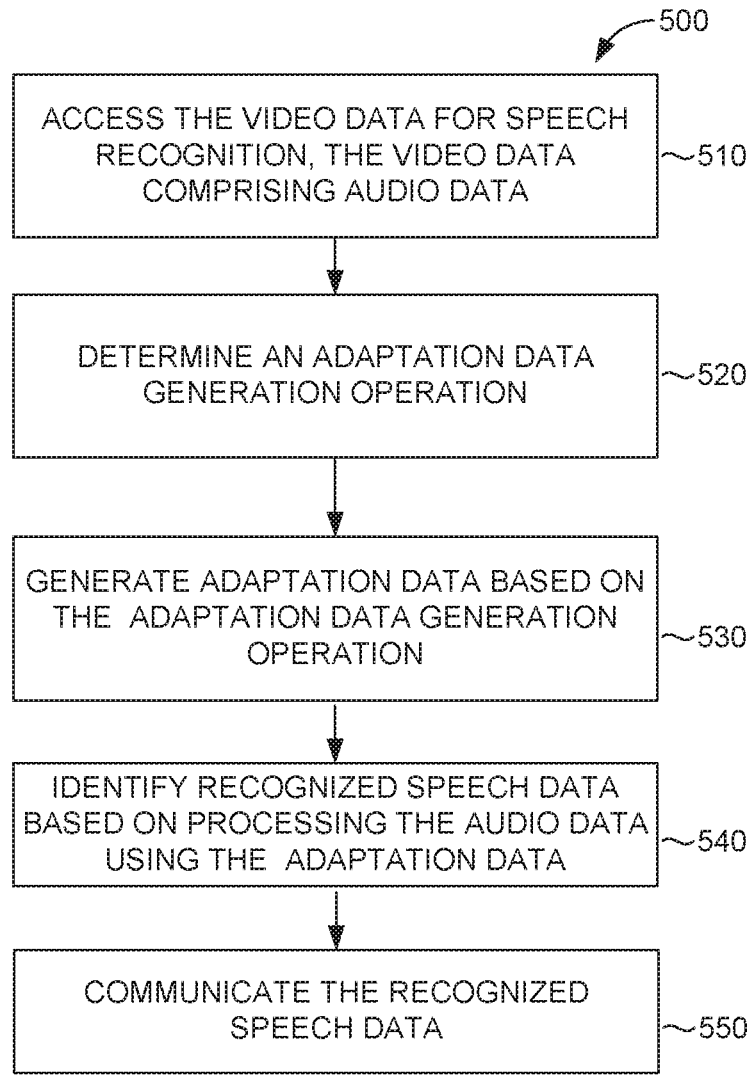
FIG. 5 is a flow diagram showing an exemplary method for implementing a media management system, in accordance with embodiments described herein.

Turning now to FIG. 5, a flow diagram is provided that illustrates a method for implementing functionality of a media management system. Initially at block 510, video data is accessed for speech recognition, the video data comprises audio data. At block 520, an adaptation data generation operation to perform on the video data is determined. At block 530, adaptation data is generated based on the adaptation data generation operation. At block 530, recognized speech data is identified based on processing the audio using the adaptation data. At block 550, the recognized speech data is communicated.

Figure 6:
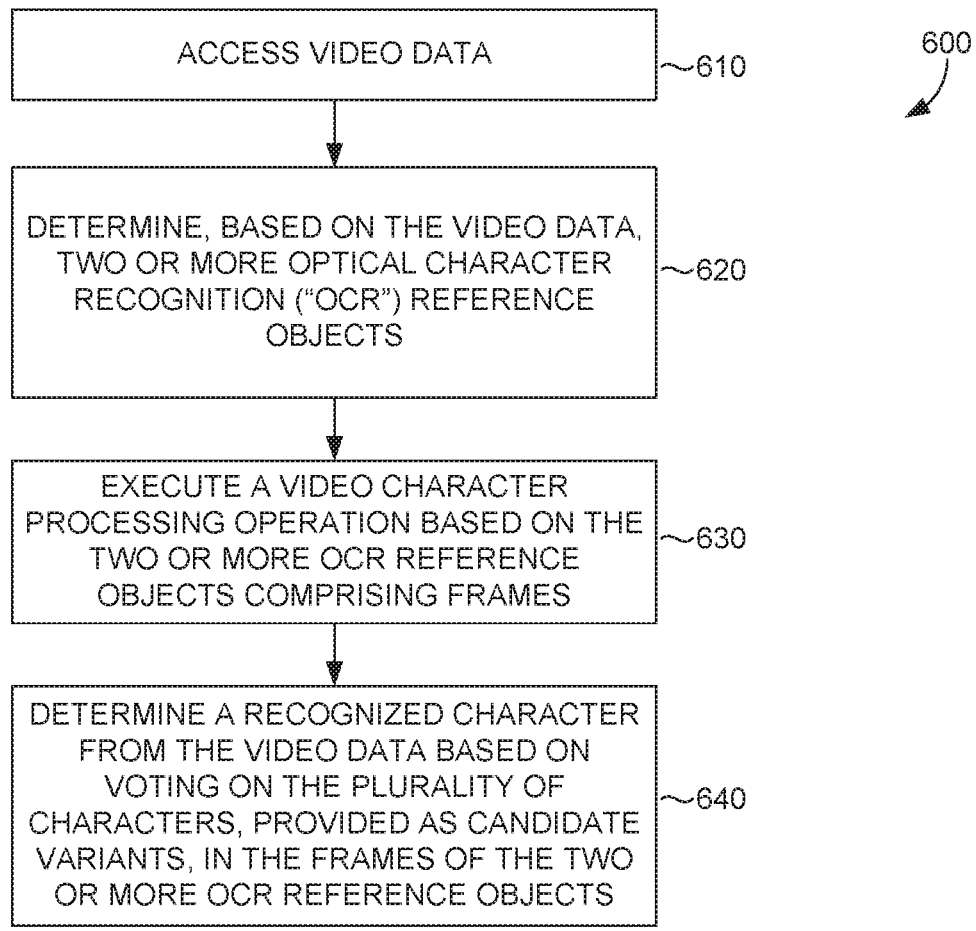
FIG. 6 is a flow diagram showing an exemplary method for implementing a media management system, in accordance with embodiments described herein.

Turning now to FIG. 6, a flow diagram is provided that illustrates implementing functionality of a media management system. Initially at block 610 video data is accessed. At block 620, based on the video data, two or more optical character recognition ("OCR") reference objects are determined for determining recognized characters. At block 630, a video character processing operation is executed based on the two or more OCR reference objects comprising frames. At block 640, a recognized character from the video data is determined, based on voting on the plurality of characters, provided as candidate variants, in the frames of the two or more OCR reference objects.

Figure 7:
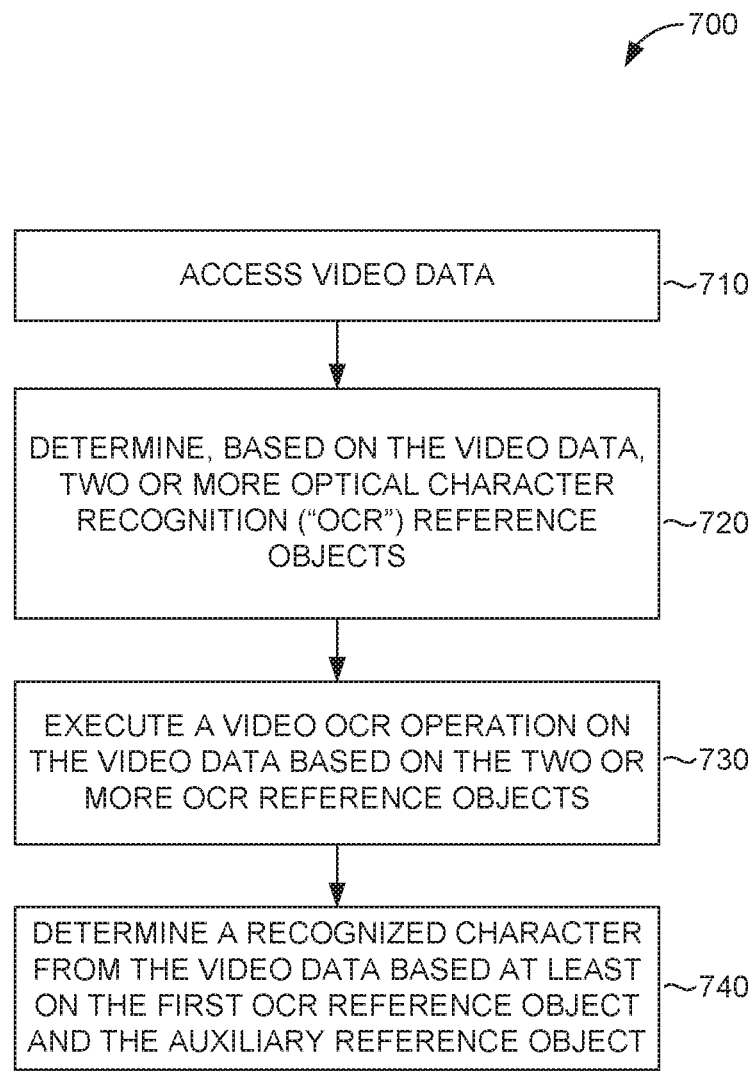

Turning now to FIG. 7, a flow diagram is provided that illustrates a implementing functionality of a media management system. Initially at block 710, video data is accessed. At block 720, based on the video data, two or more OCR reference objects are determined for determining recognized characters. At block 730, a video OCR operation is executed on the video data based on the two or more OCR reference objects. At block 740, a recognized character from the video data is determined based at least on the first OCR reference object and the auxiliary reference object.

With reference to the media management system 100, embodiments described herein can improve searching, identifying, sharing and playing back of relevant video content. The media management system components refer to integrated components that implement video management. The integrated components refer to the hardware architecture and software framework that support functionality using the media management system components. The hardware architecture refers to physical components and interrelationships thereof and the software framework refers to software providing functionality that can be implemented with hardware operated on a device. The end-to-end software-based media management system can operate within the other components to operate computer hardware to provide media management system functionality. As such, the media management system components can manage resources and provide services for the media management system functionality. Any other variations and combinations thereof are contemplated with embodiments of the present invention.

By way of example, the media management system can include an API library that includes specifications for routines, data structures, object classes, and variables may support the interaction the hardware architecture of the device and the software framework of the media management system. These APIs include configuration specifications for the media management system such that the components therein can communicate with each other in video management, as described herein.

Having identified various component of the media management system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The media management system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 8:
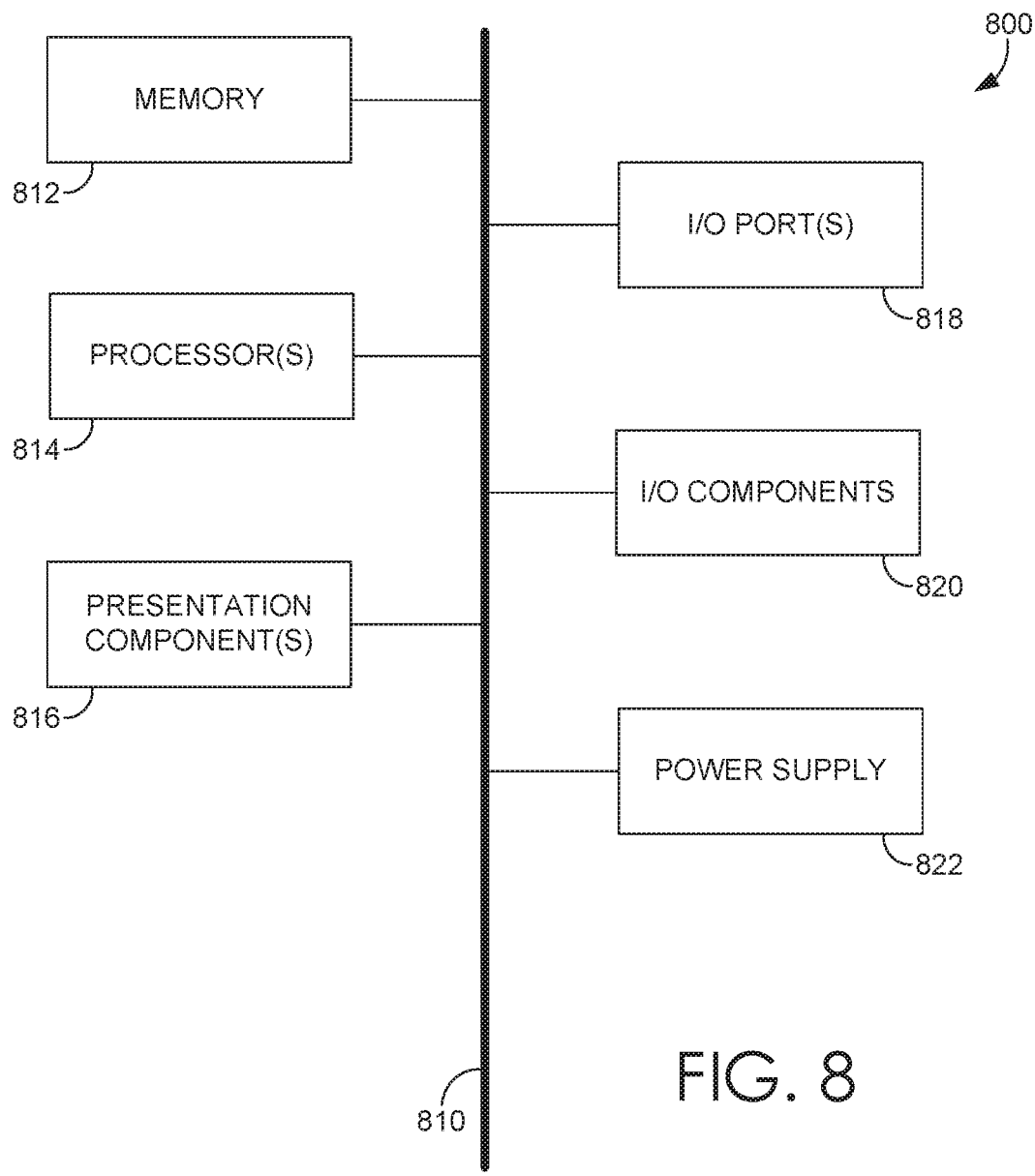
FIG. 8 is a block diagram of an exemplary computing environment suitable for use in implementing embodiments described herein.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," "mobile device," "wearable device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the media management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for providing video data processing, the system comprising:
a video data processing engine configured to:
accessing video data;
determine a video optical character recognition ("OCR") operation, wherein the video OCR operation is selected from the following:
video character processing, wherein video character processing comprises two or more of aggregating, aligning, weighting, and voting on a plurality of characters across a plurality of video character processing scenes to determine the recognized characters; and
video auxiliary data processing, wherein video auxiliary data processing comprises processing an auxiliary reference object, wherein the auxiliary reference object is an indirect reference object that is a derived input element used in determining the recognized characters;
based on the video OCR operation, determine a recognized character; and
communicate the recognized character.

2. The system of claim 1, wherein determining the video OCR operation to perform on the video data is based on properties of the video data or based on a user indication of the video OCR operation to perform on the video data.

3. The system of claim 1, further comprising video cluster processing, wherein video cluster processing is video character processing of a plurality of characters across a video to determine the recognized characters.

4. The system of claim 1, wherein the auxiliary data processing comprises language detection and selection, wherein the language detection and selection includes detecting two or more languages corresponding to the video data and executing character detection based on the selected two or more languages, while excluding other potential OCR languages corresponding to the video data.

5. The system of claim 1, wherein the indirect reference object is determined based on an auxiliary data source from a plurality of auxiliary data sources comprising the following: an entity linking knowledgebase, a facial recognition knowledgebase, an object recognition knowledgebase, a user account profile comprising an account language model, and an audio recognition knowledgebase.

6. The system of claim 1, wherein weighting the plurality of characters comprises adjusting a weighted score corresponding to each of the plurality of characters based on a plurality of weighting attributes.

7. The system of claim 1, wherein voting on the plurality of characters, provided as candidate variants, is based on majority voting or weighted voting.

8. The system of claim 1, wherein the video data processing engine further comprises an adaptation data generator configured to:
access the video data comprising a visual signal and audio data;
identify a first visual signal in the video data;
determine an adaptation data item that corresponds to the first visual signal, based on one of a public visual knowledgebase or private visual knowledgebase;
identify a speech recognition model feature of the adaptation data item;
modify a parameter of the speech recognition model based on the speech recognition model feature of the adaptation data item;
based on the speech recognition model, determining a speech recognition data item in the audio data; and
communicate the speech recognition data item.

9. One or more computer storage media having computer-executable instructions embodied thereon that, when executed, by one or more processors, cause the one or more processors to perform a method for providing video data processing, the method comprising:
accessing video data;
determining, based on the video data, two or more optical character recognition ("OCR") reference objects, wherein each of the two or more OCR reference objects comprises a frame of a video character processing scene of the video data, wherein a first frame of a first OCR reference object is different from a second frame of a second OCR reference object;
executing a video character processing operation based on the two or more OCR reference objects comprising frames, wherein character processing operation comprises:
aggregating a plurality of characters from the frames of the two or more OCR reference objects; and
weighting the plurality of characters, wherein weighting comprises adjusting a weighted score corresponding to each of the plurality of characters based on a plurality of weighting attributes; and
determining a recognized character from the video data based on voting on the plurality of characters, provided as candidate variants, in the frames of the two or more OCR reference objects.

10. The media of claim 9, wherein the first frame of the first OCR reference object is in a first video different from a second video, the second video having the second frame of the second OCR reference object.

11. The media of claim 9, wherein voting on the plurality of characters, provided as the candidate variants, is based on majority voting or weighted voting.

12. The media of claim 9, wherein determining the recognized character is further based on accessing an auxiliary reference object, wherein the auxiliary reference object identifies two or more languages corresponding to the video data, wherein executing the video character processing is based on the selected two or more languages, while excluding other potential OCR languages corresponding to the video data.

13. The media of claim 9, wherein determining the recognized character is further based on accessing an auxiliary reference object, wherein the auxiliary reference object is an indirect reference object, wherein the indirect reference object is a derived input element that is used in determining the recognized character, wherein the indirect reference object is determined based on any of the following: an entity linking knowledgebase, a facial recognition knowledgebase, an object recognition knowledgebase, a user account profile comprising an account language model, and an audio recognition knowledgebase.

14. The media of claim 9, the method further comprising:
accessing the video data comprising audio data;
identifying metadata corresponding to the video data;
selecting a secondary data source based on the metadata;
accessing an adaptation data item from the secondary data source;
identifying a speech recognition model feature of the adaptation data item;
modifying a parameter of the speech recognition model based on the speech recognition model feature of the adaptation data item;

based on the speech recognition model, determining a speech recognition data items in the audio data; and communicating the speech recognition data item.

15. A computer-implemented method for providing video data processing, the method comprising:

accessing video data;

determining, based on the video data, two or more optical character recognition ("OCR") reference objects, wherein a first OCR reference object comprises a frame of a video character processing scene of the video data, and wherein a second reference object comprises an auxiliary reference object based on the video data, wherein the auxiliary reference object is an indirect reference object that is a derived input element used in determining the recognized characters;

executing a video OCR operation on the video data based on the two or more OCR reference objects; and determining a recognized character from the video data based at least on the first OCR reference object and the auxiliary reference object.

16. The computer-implemented method of claim 15, further comprising a plurality of OCR reference objects comprising frames of video data, wherein recognizing characters is based on two or more of: aggregating, aligning, weighting, and voting on a plurality of characters across a plurality of video character processing scenes.

17. The computer-implemented method of claim 16, wherein weighting the plurality of characters comprises adjusting a weighted score corresponding to each of the plurality of characters based on a plurality of weighting attributes.

18. The computer implemented method of claim 15, wherein the auxiliary reference object identifies two or more languages as preferred languages for performing recognition operations, while excluding other potential OCR languages corresponding the video data, such that detecting the plurality of characters from the first OCR reference object is based on the selected two or more languages.

19. The computer implemented method of claim 15, wherein the indirect reference object is determined based on an auxiliary data source from a plurality of auxiliary data sources comprising the following: an entity linking knowledgebase, a facial recognition knowledgebase, an object recognition knowledgebase, a user account profile comprising an account language model, and audio recognition knowledgebase.

20. The computer implemented method of claim 19, the method further comprising:

accessing the video data comprising audio data;

identifying metadata corresponding to the video data;

selecting a secondary data source based on the metadata;

accessing an adaptation data item from the secondary data source;

identifying a speech recognition model feature of the adaptation data item;

modifying a parameter of the speech recognition model based on the speech recognition model feature of the adaptation data item;

based on the speech recognition model, determining a speech recognition data items in the audio data; and communicating the speech recognition data item.

* * * * *